Patented Feb. 8, 1938

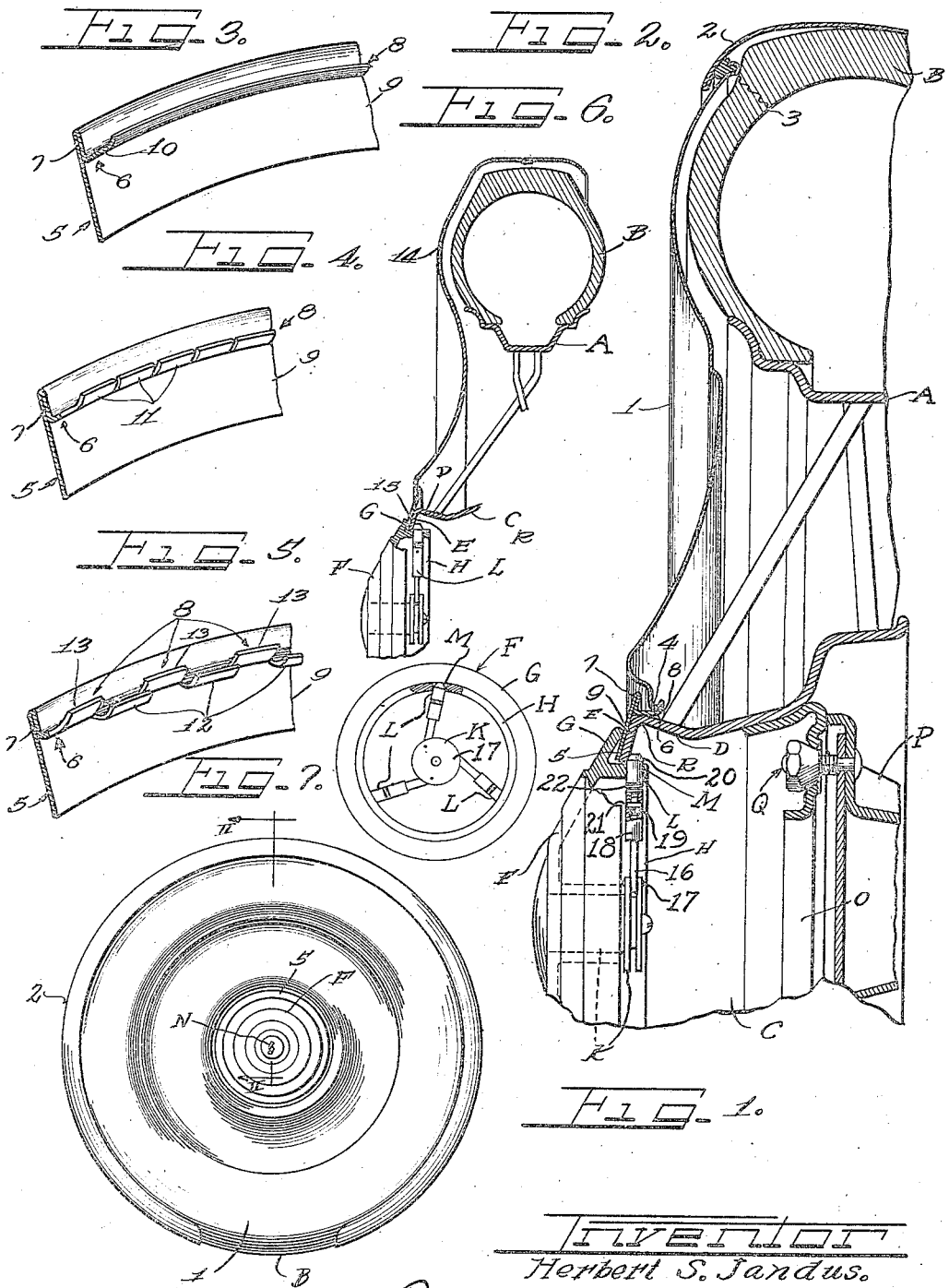

2,107,332

UNITED STATES PATENT OFFICE 2,107,332

TIRE COVER AND LOCK CONSTRUCTION

Herbert S. Jandus, Detroit, Mich., assignor, by mesne assignments, to Houdaille-Hershey Corporation, Detroit, Mich., a corporation of Michigan Application December 9, 1932, Serial No. 646,447

9 Claims. (Cl. 150—54)

This invention has to do with tire covers and concerns more particularly means for locking a one-piece tire cover, or the side plate of a multi-part tire cover in proper tire protecting position.

It is an object of this invention to provide an adapter by which a tire cover side plate may be secured in position to properly protect a side wall of a spare tire and embodying means whereby the adapter may be readily attached to the hub of a spare wheel.

It is another object of the invention to provide an adapter by means of which a tire cover side plate may be removably secured under anti-rattling conditions in coaxial relation to a spare wheel and tire, regardless of the width of the tire.

It is a further object of the invention to utilize a hub cap locking mechanism for also locking a tire cover in proper tire protecting position on a spare wheel and tire.

Another object of the invention resides in the utilization of a hub cap lock for locking a side plate of a tire cover to the hub of the spare wheel in such a manner as not only to prevent theft of the cover but also of the spare tire itself.

In carrying out the invention into practice in accordance with one form, a tire cover side plate is formed to extend substantially from the side of the tire tread inwardly to substantially the hub of the wheel. The adapter to be used in conjunction with the side plate is in the form preferably of a ring and is provided with a lateral flange which may be continuous or in the form of a continuous series of fingers of such diameter that it may be slipped onto the outer end of the hub with the flange resiliently engaging the hub. The flange is formed so that it is received in the central opening of the tire cover side plate, the engagement between the two parts being preferably snug. The flange may be crimped outwardly at its free margin after the side plate is mounted thereon, to prevent accidental separation of the parts. Sufficient clearance is provided between the crimped portion and the opposite margin of the flange to permit the inner peripheral edge of the side plate to engage different portions of the flange. The purpose of this construction is to permit the side plate to be accommodated by the flange regardless of the width of the tire or the tire tread, since it is well known that there are on the market tires of different widths although of the same standard diameter. The construction is such also that it may be used with tires of different diameters. The adapter is positioned between the hub and the outer part of the hub cap, and when the locking instrumentalities for the cap are employed to prevent theft of the cap, said instrumentalities are likewise effective in preventing theft of the adapter and consequently of the side plate which supports the same. The side plate is thereby maintained in coaxial relation to the spare wheel and tire.

In the event a tire cover of the one-piece type embodying a side plate and rim is employed, the adapter may be dispensed with, the side plate being formed to extend inwardly sufficiently so that it may be mounted between the outer flange of the hub cap and the hub so that it is locked in position subtantially in the same way in which the adapter of the above-described form of the invention is locked in position. Since, with this form of tire cover, engagement with the tire is unlikely or unnecessary, no provision is made for axial adjustment of the cover.

With this construction, which is exceedingly simple involving a minimum of parts which may be manufactured at a minimum cost, locking instrumentalities which are normally employed for securing a hub cap against theft are made available to hold a tire cover in proper tire protecting position and at the same time lock both the tire cover and the spare tire against theft from the spare wheel and also the wheel itself.

Further objects and advantages of the invention will appear as the description proceeds.

This invention (in preferred forms) is illustrated in the accompanying drawing and hereinafter more fully described.

On the drawing:

Figure 1 is a view in elevation of one form of the invention applied to a spare wheel and tire.

Figure 2 is an enlarged fragmentary sectional view taken approximately in the plane designated by the line II—II of Figure 1.

Figures 3, 4 and 5 are fragmentary perspective views of as many forms of adapters embodying the principles of the present invention.

Figure 6 is a view similar to Figure 2, but reduced in size, showing a modified form of the invention.

Figure 7 is a fragmentary view of details of the hub cap locking means.

Referring now more particularly to the drawing wherein the same parts are designated throughout by the same reference characters, and directing attention to the form of the invention appearing in Figures 1 and 2, the spare wheel A is shown carrying a spare tire B provided with a hub C which, at its outer end, inclines outwardly at D and is formed with an inwardly extending flange E. A hub cap F is formed with a flange G arranged to overlie the hub flange E, and with a generally cylindrical skirt H arranged to fit within the hub flange E. The cap F carries at its center a lock cylinder K which pivotally carries a plurality of spoke-like lock plungers L which are guided in openings M in the skirt H and are shifted into the position shown for securely locking the hub cap in position, or are withdrawn substantially within the outer confines of the skirt H to permit withdrawal of the hub cap F under the control of a key applied to the lock cylinder opening N.

The locking instrumentalities including the plungers L are preferably of such construction that the plungers L are spring-urged outwardly to prevent rattling of the hub flange G both in the presence and in the absence of the adapter to be presently described.

The hub C preferably carries a ring-like attaching member O which is releasably attached to the wheel carrier hanger P (permanently secured to the vehicle, not shown), by nut and bolt means Q. When the hub cap F is locked in position, it prevents access to the nuts of the securing means Q and thereby serves as a spare wheel lock.

In accordance with one form of the invention, a tire cover side plate 1 formed to cooperate with a preferably resilient tread covering rim member 2, and arranged at its outer periphery 3 to engage a side of the tire tread, is formed with a central opening of such diameter as to afford some clearance between the same and the adjacent outer peripheral portion R of the hub C.

A margin of this opening is curled by spinning or otherwise to provide a rounded wall 4 for the central opening. The portion 3 of the tire cover side plate 1 is preferably the only means of contact between the side plate and the tire B.

For the purpose of properly mounting the side plate 1 on the hub C so that the side plate is held from rattling as well as maintained in substantially coaxial relation to the wheel, an adapter of any suitable construction is provided. The adapter 5 shown in Figure 3 is annular and includes a flat portion 9 and an angularly related generally cylindrical skirt 6 and is made preferably of metal which is return-bent upon itself at 7, forming a wall at one margin of the skirt 6. The skirt 6 is formed with a diameter such that when the same is placed over the portion R of the hub C, the resultant fit is snug, thereby inhibiting rattling between the parts when the adapter 5 is secured in position. The skirt 6 is preferably of sufficient flexibility so that the inner peripheral portion 4 of the side plate 1 may be snapped over the outwardly extending lip 8 of the adapter, thereby causing said lip to be flexed radially inwardly. However, if desired, the lip 8 need not be formed until after the side plate inner peripheral portion 4 is fitted in surrounding relation to the skirt 6. In such event, the lip 8 may be spun into the shape shown. It will be observed that when the adapter and side plate are assembled as shown in Fig. 2, the wall 7 on the one side and the lip 8 on the other side prevent separation of the plate and adapter. The axial extent of the skirt 6 is in excess of that of the surrounding portion 4 of the side plate 1, thereby allowing the side plate to assume different positions relative to the adapter and axially thereof. This is desirable since the size of the tire which may be employed in conjunction with a given sized wheel A may vary in width, and, of course, the tread may also vary in width, so that the portion 3 of the side plate 1 may, in some instances, engage the tire at a point closer and under other circumstances at a plane farther away from the car on which the spare wheel is mounted. Consequently, the inner peripheral portion 4 of the side plate 1 will occupy different positions axially relative to the outer peripheral portion R of the hub C, and it is to accommodate the inner peripheral portion 4 in the various positions in which it may be placed that the clearance between the same and the skirt wall and lip portions 7 and 8, respectively, is provided. While it is preferred that the engagement between the skirt 6 and the inner peripheral portion 4 of the side plate 1 engage each other with a snug fit, it is to be understood also that they may be moved relatively axially if desired. The flat portion 9 of the adapter may extend in a direction to conform to the shape of the inwardly extending flange E of the hub C, and accordingly may be formed frusto-conical as shown, radial or otherwise. The skirt 6 may be formed continuous as shown at 10 in Figure 3 or may consist of a conformed with fingers like the fingers 11 of Figure 4 having the same general shape as the skirt portion 10 and associated lip 8, or the skirt may be formed with fingers like the flangers 11 of Figure 4 but alternately depressed and raised as shown at 12 and 13, respectively, in Figure 5. By employing fingers as shown in Figures 4 and 5, obviously a greater degree of resilience will be afforded for engagement of the skirt both with the portion R of the hub C and with the inner peripheral portion 4 of the tire cover side plate 1. In employing the form of adapter 5 appearing in Figure 5, the inner fingers 12 will resiliently engage the portion R of the hub C, and the outer fingers 13 will resiliently engage the inner peripheral portion 4 of the side plate 1. When the parts are assembled on the hub portion R, all of the fingers 12 and 13 are maintained in substantially the shape in which the fingers 11 normally appear as shown in Figure 4.

The tread covering member 2, by reason of its resilience and tendency to hug the tread of the tire, serves to hold the outer peripheral portion 3 of the side plate 1 in engagement with the tire. When the side plate 1 is mounted on the adapter 5, the two comprise substantially a unit though they are capable of limited relative axial movement. With the parts arranged as shown in Figure 2, it will be observed that the locked cap F not only prevents theft of the wheel A by preventing access to the nut and bolt means Q, but also prevents theft of the side plate 1, and since the side plate 1 overhangs a substantial part of the tire B, the latter cannot be stolen from the spare wheel A. At the same time, the adapter 5 is effective in properly centering the side plate 1 on the wheel A, and further serves as means for supporting the side plate independently of the tread covering rim 2 so that the rim may be applied to or removed from the tire B without requiring attention to the side plate 1. The tire cover parts and hub cap F are preferably made of metal and preferably of sheet metal although other materials found suitable may be employed. The adapter is of extremely simple construction and may be formed very easily at low cost. Once assembled with the side plate 1, the adapter 5, to all intents and purposes, becomes a part of the side plate construction.

A number of different forms of tire covers is in vogue and the present invention has been devised to secure different types of covers to the hub of a spare wheel. In the form of tire cover heretofore described, a separate side plate 1 is employed for substantially covering the outer side wall and substantially the entire spare wheel from the hub outwardly. In Figure 6 is shown another type of tire cover which is formed to cover not only the spare wheel and outer side wall of the tire but also the tread of the tire, the cover being made substantially in one piece, that is, in a substantially integral member, which is designated 14. The cover 14 is formed to extend in a generally radial direction inwardly and is formed with a central opening of substantially the same diameter as that of the hub flange E. The inner peripheral portion 15 of the cover 14 is preferably formed so that it fits against the hub flange E in much the same way in which the flat portion 9 of the above described adapter fits against said flange E, and in the illustrated example of the invention is given a frusto-conical shape. The flange G of the hub cap F is formed to cooperate with the hub flange E to form substantially a circular groove in which the inner portion 15 of the cover 14 is received, and when the lock instrumentalities are operated to position the plungers L in engagement with the inner surface of the hub flange E, the parts are locked together. The locking means including the hub F are thus effective as a triple lock in the manner above described in connection with the form of the invention shown in Figure 2, in that they prevent access to the means by which the spare wheel is attached to the wheel carrier, they prevent theft of the tire cover 14, and through the latter they prevent unauthorized removal of the spare tire B. When supported as just described, the cover 14 is substantially centered with respect to the spare wheel and tire, and is in spaced relation to the tire B throughout. It is thus possible to employ the same tire cover 14 with tires which may vary in size both radially and transversely, without affecting the proper securement of the tire cover on the hub C. The flange G of the hub cap F is of sufficient extent to insure its concealing the opening in the tire cover.

The plungers L and associated parts may be of any desirable construction provided it is effective to properly secure the hub cap alone or in conjunction with a tire cover member as herein described, and preferably so as to be anti-rattling. One illustrative form of plunger construction embodies a rod 16 pivoted at 17 to the key controlled lock cylinder means K and carrying a socket member 18 in which the stem 19 of the catch 20 is slidable to a limited extent due to the pin and slot connection 21 therebetween. A spring 22 between the catch 20 and the socket member 18 urges the catch outwardly to prevent rattling of the parts connected thereby. The pin and slot connection 21 is such as to permit the catch 20 to engage the hub flange E when the cap flange G engages the hub flange, as when the cover is removed, but will effect a retraction of the catch 20 within the outer confines of the cap skirt H when the lock cylinder is turned to open position, as shown in Figure 7. The openings M are formed to permit the catches 20 to rockably slide therein.

I am aware that many changes may be made and numerous details of construction may be varied through a wide range without departing from the principles of this invention, and I, therefore, do not purpose limiting the patent granted hereon otherwise than as limited by the scope of the appended claims.

I claim as my invention:

1. Tire cover construction comprising an adaptor part having means whereby the same may be releasably attached to a wheel hub and a second part for covering the outer side of a spare wheel and spare tire carried thereby, the second part having a rib for engagement with the tire and for spacing the remainder of the second part from the tire and wheel, one of said parts having a recess extending in the general direction of its axis adjacent the wheel hub and the other part having a projection fitting in and capable of axial movement in said recess, whereby said second part may be employed in connection with spare tires of different widths, and key operated means for locking one of said parts to the hub.

2. An adapter for supporting a cover on a wheel including a central hub and comprising an annular member formed to engage the outer rim of the wheel hub and having a generally cylindrical skirt for peripherally embracing said rim of the hub in surrounding relation thereto and having a recessed portion contiguous with said wheel hub rim and in which the inner edge of the cover is adapted to be retained.

3. As an article of manufacture, an adapter for retaining a cover on a wheel and having an annular skirt of generally cylindrical form and including a series of fingers projecting alternately inwardly and outwardly, whereby the inwardly projecting fingers may grip a support and the outwardly projecting fingers may grip the cover to be supported.

4. As an article of manufacture, an adapter for retaining a cover on a wheel and having an annular skirt of generally cylindrical form and including a series of fingers projecting alternately inwardly and outwardly, whereby the inwardly projecting fingers may grip a support and the outwardly projecting fingers may grip the cover to be supported, means located at one margin of the skirt and extending outwardly therefrom, said outwardly extending fingers being formed at their free ends with outwardly extending lips, said means and lips serving to prevent separation of said adapter from the cover supported thereby.

5. In a combination including a bracket permanently secured to a vehicle and a spare wheel supported on said bracket by means accessible from the outer side of the wheel, a spare tire carried by the wheel, a hub cap closing the outer opening of the wheel hub and key operated means for locking the hub cap in position and thereby preventing access to the supporting means for the spare wheel: a cover for the outer side wall of the tire and the outer side of the wheel, a supporting adapter member secured to the wheel by said cap, and a connection affording relative axial movement and preventing rattling between the cover and member, whereby said cover may be employed in conjunction with tires of different widths.

6. In combination with a wheel including a central hub part, a cover for disposition over the outer side of the wheel, having a central opening adjacent said hub part and being provided with a central annular adapter held thereon by a snap-on engagement between said adapter and the inner edge of said cover and a hub cap for clamping said adapter to said hub part.

7. In combination with a wheel including a central hub part, a cover for disposition over the outer side of the wheel, having a central opening adjacent said hub part and being provided with a central annular adapter held thereon by a snap-on engagement between said adapter and the inner edge of said cover and a hub cap for clamping said adapter to said hub part, said adapter including a substantially radially extending flange over the outer edge of which the inner edge of said cover is snapped to connect said adapter to said cover.

8. In combination with a wheel including a central hub part, a cover for disposition over the outer side of the wheel, having a central opening adjacent said hub part and being provided with a central annular adapter held thereon by a snap-on engagement between said adapter and the inner edge of said cover and a hub cap for clamping said adapter to said hub part, said adapter having a central opening through which a skirt of said hub cap extends for telescoping cooperation with said hub part.

9. In combination with a wheel including a central hub part, a cover for disposition over the outer side of the wheel, having a central opening adjacent said hub part and being provided with a central annular adapter held thereon by a snap-on engagement between said adapter and the inner edge of said cover and a hub cap for clamping said adapter to said hub part, said adapter having a central opening through which a skirt of said hub cap extends for telescoping cooperation with said hub part, said adapter having an annular groove in its outer periphery into which the inner edge of said cover is adapted to be resiliently snapped to support said cover on said adapter.

HERBERT S. JANDUS.